(12) United States Patent
Mori

(10) Patent No.: US 11,181,910 B2
(45) Date of Patent: Nov. 23, 2021

(54) VEHICLE CONTROLLER AND COMPUTER READABLE STORAGE MEDIUM

(71) Applicant: HONDA MOTOR CO., LTD., Tokyo (JP)

(72) Inventor: Takashi Mori, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 218 days.

(21) Appl. No.: 16/391,301

(22) Filed: Apr. 23, 2019

(65) Prior Publication Data

US 2019/0324453 A1 Oct. 24, 2019

(30) Foreign Application Priority Data

Apr. 24, 2018 (JP) ............................ JP2018-083392

(51) Int. Cl.
| | |
|---|---|
| *G05D 1/00* | (2006.01) |
| *G05D 1/02* | (2020.01) |
| *B60W 10/04* | (2006.01) |
| *B60W 50/14* | (2020.01) |
| *B60W 50/08* | (2020.01) |

(52) U.S. Cl.
CPC ........... *G05D 1/0061* (2013.01); *B60W 10/04* (2013.01); *B60W 50/082* (2013.01); *B60W 50/14* (2013.01); *G05D 1/0223* (2013.01); *B60W 2050/146* (2013.01); *B60W 2520/105* (2013.01);
(Continued)

(58) Field of Classification Search
CPC ............... G05D 1/0061; G05D 1/0223; G05D 2201/02; G05D 2201/0213; G05D 1/0038; B60W 10/04; B60W 50/14; B60W 50/082; B60W 2554/801; B60W 2050/146;
(Continued)

(56) References Cited

U.S. PATENT DOCUMENTS

| | | | |
|---|---|---|---|
| 2018/0365908 A1* | 12/2018 | Liu | ...................... G05D 1/0044 |
| 2020/0406911 A1* | 12/2020 | She | ................. B60W 30/18163 |

(Continued)

FOREIGN PATENT DOCUMENTS

| | | |
|---|---|---|
| JP | 2000311299 A | 11/2000 |
| JP | 2004206218 A | 7/2004 |
| JP | 2016074317 A | 5/2016 |

OTHER PUBLICATIONS

Office Action issued for counterpart Japanese Application No. 2018-083392, issued by the Japanese Patent Office dated Sep. 14, 2021 (drafted on Sep. 8, 2021).

*Primary Examiner* — Richard M Camby

(57) ABSTRACT

A vehicle controller is provided, which controls a vehicle having a first driving mode in which the vehicle travels according to a first control signal based on on manual driving or automated driving, and a second driving mode in which the vehicle travels according to a second control signal based on remote driving, where the vehicle controller includes: a vehicle control unit configured to control the vehicle; a characteristic determining unit configured to determine a travelling characteristic of the vehicle during a period in which the vehicle control unit is controlling the vehicle according to the second control signal; and a mode control unit configured to, when a characteristic determined by the characteristic determining unit satisfies a predetermined condition, cause the vehicle to exit the second driving mode and enter the first driving mode.

15 Claims, 9 Drawing Sheets

(52) U.S. Cl.
CPC ... *B60W 2554/801* (2020.02); *G05D 2201/02* (2013.01)

(58) Field of Classification Search
CPC ......... B60W 2520/105; B60W 30/182; B60W 40/00; B60W 2050/143
See application file for complete search history.

(56) References Cited

U.S. PATENT DOCUMENTS

| | | | |
|---|---|---|---|
| 2021/0031807 A1* | 2/2021 | Yamamoto | G05D 1/0061 |
| 2021/0041262 A1* | 2/2021 | Rockmore | B60W 30/00 |

* cited by examiner

VEHICLE CONTROLLER AND COMPUTER READABLE STORAGE MEDIUM

The contents of the following Japanese patent application are incorporated herein by reference:
NO. 2018-083392 filed on Apr. 24, 2018.

BACKGROUND

1. Technical Field

The present invention relates to a vehicle controller and a computer readable storage medium.

2. Related Art

A technology to remotely drive an vehicle by an electric vehicle or to remotely drive a vehicle by a remote driving apparatus for remote driving has been known (for example, refer to Patent Documents 1 and 2).

PRIOR ART LITERATURE

Patent Document

[Patent Document 1] Japanese Patent Application Publication No. 2000-311299
[Patent Document 2] Japanese Patent Application Publication No. 2004-206218

SUMMARY

It is desirable to provide a technology that can achieve remote driving suitable for an occupant of a target vehicle for the remote driving.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
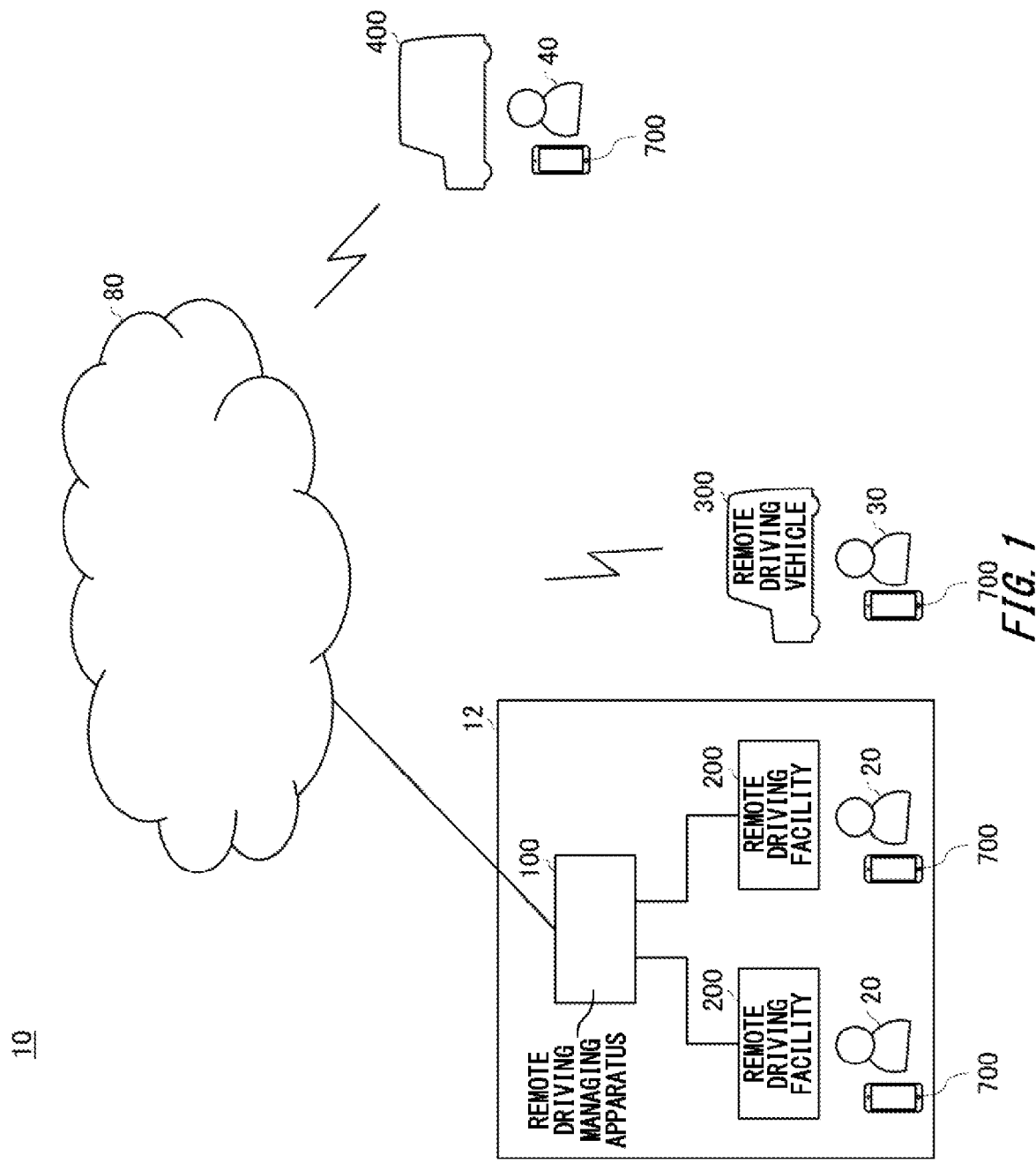
FIG. 1 schematically shows one example of a remote driving system 10.

FIG. 1 schematically shows one example of a remote driving system 10. The remote driving system 10 includes a remote driving management center 12, a remote driving vehicle 300 and a vehicle 400. Although one remote driving vehicle 300 is exemplified in FIG. 1, the number of the remote driving vehicles 300 may also be plural. Also, although one vehicle 400 is exemplified in FIG. 1, the number of the vehicles 400 may also be plural. The remote driving management center 12 includes a remote driving managing apparatus 100 and a plurality of remote driving facilities 200. Although two remote driving facilities 200 are exemplified in FIG. 1, the number of remote driving facilities 200 may also be three or more.

The remote driving facility 200 is a facility for remotely driving the vehicle 400 via a network 80. The network 80 may be any network, and for example, may include at least any one of Internet, a mobile phone network such as so-called 3rd Generation (3G), Long Term Evolution (LTE), 4th Generation (4G) and 5th Generation (5G), a public wireless Local Area Network (LAN), and a dedicated network.

The remote driving facility 200 is a facility mocking a drive seat of an automobile, for example. The remote driving facility 200 includes a manipulating unit that receives a manipulation by a driver 20 who remotely drives the vehicle 400, and a communication unit that sends, to the vehicle 400, a signal according to a manipulation performed on the manipulating unit. The remote driving facility 200 is one example of a remote driving apparatus. The driver 20 is one example of a remote driver. The manipulating unit includes a manipulation member required for vehicle driving, such as a handle, an accelerator pedal, a brake pedal, a shift lever and a blinker lever. Also, the manipulating unit may also further include a manipulation member for manipulating equipment such as a car navigation system, an air conditioner, an audio, a slide door, a sunroof and a seat heater. The communication unit receives an image of an area surrounding the vehicle 400 captured by an image-capturing unit included in the vehicle 400. The remote driving facility 200 has a display unit that displays the image of the area surrounding the vehicle 400 received by the communication unit. The driver 20 manipulates the manipulating unit while viewing the image displayed on the display unit, thereby achieving the remote driving of the vehicle 400.

The remote driving vehicle 300 is an automobile that has a remote driving function to remotely drive the vehicle 400 via the network 80. Manual driving may be permissible on the remote driving vehicle 300. The manual driving means that the vehicle is driven by manipulating the manipulating unit included in the vehicle. Also, a so-called automated driving may also be permissible on the remote driving vehicle 300.

The remote driving vehicle 300 includes a manipulating unit that receives a manipulation by a driver 30, and a communication unit that communicate with the vehicle 400 and the remote driving managing apparatus 100. The remote driving vehicle 300 is one example of the remote driving apparatus. The driver 30 is one example of the remote driver. The manipulating unit includes a manipulation member required for vehicle driving, such as a handle, an accelerator pedal, a brake pedal, a shift lever and a blinker lever. Also, the manipulating unit may further include a manipulation member for manipulating equipment such as an air conditioner, an audio, a car navigation system, a slide door, a sunroof and a seat heater. The communication unit receives an image of an area surrounding the vehicle 400 captured by an image-capturing unit included in the vehicle 400. The remote driving vehicle 300 has a display unit that displays the image of the area surrounding the vehicle 400 received by the communication unit. For example, the remote driving vehicle 300 has a manual driving mode and a remote driving mode to travel according to the manipulation performed on the manipulating unit in the manual driving mode and to send, to the vehicle 400, a signal according to the manipulation performed on the manipulating unit in the remote driving mode. The driver 30 can remotely drive the vehicle 400 by switching the mode of the remote driving vehicle 300 parked in a parking area at the driver's home to the remote driving mode, for example.

The vehicle 400 is an automobile that can be remotely driven by the remote driving facility 200 or the remote driving vehicle 300. In addition to being able to be remotely driven, the vehicle 400 can be manually driven. Also, automated driving may be permissible on the vehicle 400. The vehicle 400 may have a remotely driven mode in which the vehicle 400 travels according to a control signal based on remote driving, a manual driving mode in which the vehicle 400 travels according to a control signal based on manual driving, and an automated driving mode in which the vehicle 400 travels according to a control signal based on automated driving. The manual driving mode may be one example of a first driving mode. The automated driving mode may be one example of the first driving mode. The remotely driven mode may be one example of a second driving mode.

In a case of the automated driving mode, the vehicle 400 performs travelling, stopping, turning and the like of itself by using an apparatus, such as an image-capturing unit and a radar that are provided to the vehicle 400, position information and map information without steering, accelerator pedal manipulation, brake pedal manipulation, gear change manipulation, and the like by the driver. In a case of the remotely driven mode, the vehicle 400 performs travelling, stopping, turning and the like according to a control signal received from the remote driving facility 200 or the remote driving vehicle 300.

The remote driving managing apparatus 100 provides a remote driving service to a plurality of vehicles 400. The remote driving managing apparatus 100 may provide the remote driving service to a vehicle 400 that is registered in the service. The remote driving managing apparatus 100 may store registration data of the plurality of vehicles 400. The registration data of the vehicles 400 includes vehicle information of each of the plurality of vehicles 400. The vehicle information may include identification information, vehicle type, vehicle name and the like of the vehicle 400.

The remote driving managing apparatus 100 may store registration data of a plurality of remote drivers. The registration data of the remote driver may include identification information for identifying the remote driver, identification information for identifying a remote driving apparatus corresponding to the remote driver, identification information for identifying a communication terminal 700 of the remote driver, and a period of time in which the remote driving can be performed. The communication terminal 700 may be a mobile phone such as a smart phone, a tablet terminal, a PC (Personal Computer) and the like.

The period of time in which the remote driving can be performed is a period of time in which a remote driver can remotely drive the vehicle 400, and is registered by the remote driver, for example. The driver 20 may register the period of time in which the remote driving can be performed in the remote driving managing apparatus 100 via the remote driving facility 200. Also, the driver 30 may register the period of time in which the remote driving can be performed in the remote driving managing apparatus 100 via the remote driving vehicle 300. Also, the remote driver may also register the period of time in which the remote driving can be performed in the remote driving managing apparatus 100 via the network 80 by using the communication terminal 700.

When the request information for requesting for remotely driving the vehicle 400 is received, the remote driving managing apparatus 100 refers to the registration data of the remote drivers to determine a remote driver who is to perform the remote driving on the vehicle 400. The remote driving managing apparatus 100 receives the request information that is sent by an occupant 40 of the vehicle 400 and that is for requesting for remotely driving the vehicle 400, for example. The occupant 40 sends the request information from the vehicle 400 to the remote driving managing apparatus 100, for example. Also, the occupant 40 sends the request information from the communication terminal 700 that the occupant 40 owns to the remote driving managing apparatus 100, for example.

The request information includes identification information for identifying the vehicle 400. The request information may include section information that indicates a travelling section in which the vehicle 400 travels by remote driving. The request information may include position information that indicates a position of the vehicle 400. The request information may include time information that indicates a desired period of time in which the vehicle 400 is remotely driven.

For example, if the occupant 40 of the vehicle 400 desires to perform the remote driving from his/her home to a destination, the occupant 40 sends, to the remote driving managing apparatus 100, the request information including section information that indicates a travelling section from his/her home to the destination and time information determined based on a departure time and a required time from from his/her home to the destination. The required time from his/her home to the destination may be set by the occupant 40, may also be set by the communication terminal 700 of the occupant 40, and may also be set by a navigation apparatus provided to the vehicle 400.

Also, for example, when the occupant 40 of the vehicle 400 is to move the vehicle 400 on a route to the destination by manual driving, if the occupant 40 of the vehicle 400 desires to perform the remote driving in a partial section, the occupant 40 sends, to the remote driving managing apparatus 100, request information that includes section information indicating the section and time information indicating a period of time in which the vehicle 400 is to travel in the section.

Also, for example, when the vehicle 400 is to be moved to the destination by automated driving, if a moving route of the vehicle 400 includes a remote driving section that is a section in which the vehicle 400 travels by the remote driving, the vehicle 400 sends, to the remote driving managing apparatus 100, the request information including section information indicating the section and time information indicating a period of time in which the vehicle 400 travels in the section. The remote driving section is, for example, a section in which the automated driving cannot be performed, a section in which the automated driving is prohibited, a section in which the automated driving is not proper, and the like.

The remote driving managing apparatus 100 requests the determined remote driver to perform the remote driving on the vehicle 400. The remote driving managing apparatus 100 sends request information including the section information and the time information to the communication terminal 700 of the determined remote driver and to a remote driving apparatus corresponding to the determined remote driver, for example. The remote driver receiving the request performs the remote driving on the vehicle 400 by using the remote driving apparatus. The remote driver causes, by the remote driving, the vehicle 400 to travel in the travelling section indicated by the section information for a period of time indicated by the time information.

Here, during the remote driving of the vehicle 400, if a state of communication between the remote driving apparatus and the vehicle 400 is poor or if the remote driver is sleepy, a travelling safety degree of the vehicle 400 may be lowered. Also, in a case where the remote driver has a preference for so-called rough driving as well, the travelling safety degree of the vehicle 400 may be lowered. On the other hand, as long as the occupant 40 of the vehicle 400 can stop the remote driving, the travelling with a low safety degree can be prevented from continuing. However, it is assumed that during the remote driving of the vehicle 400, the occupant 40 of the vehicle 400 may feel sleepy, manipulate the communication terminal 700 or read books. In this case, it is considered that the attention of the occupant 40 to the travelling of the vehicle 400 is lowered and may not even aware that the driving with a lowered safety degree is being performed.

On the other hand, the vehicle controller provided to the vehicle 400 according to the present embodiment determines a travelling characteristic of the vehicle 400 during the vehicle 400 is remotely driven, and when the characteristic satisfies a predetermined condition, switches the driving to the manual driving or the automated driving. For example, when the travelling safety degree of the vehicle 400 is less than a predetermined threshold, the vehicle controller outputs a warning to the occupant 40 and switches the driving to the manual driving. Also, for example, when the travelling safety degree of the vehicle 400 is less than the predetermined threshold, the vehicle controller switches the driving to the automated driving. Accordingly, the travelling with a lowered safety degree can be prevented from continuing.

Figure 2:
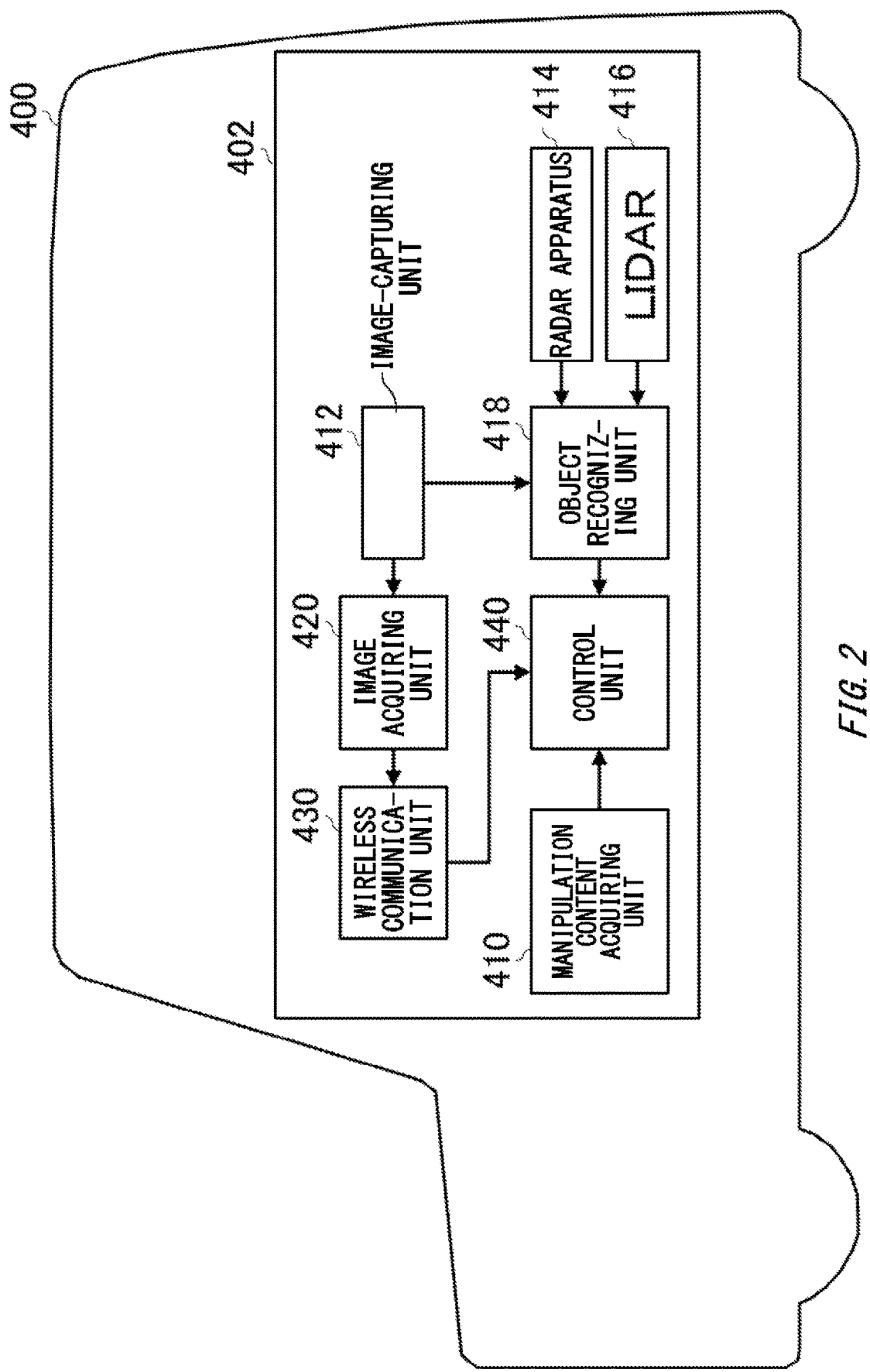
FIG. 2 schematically shows one example of a functional configuration of a vehicle 400.

FIG. 2 schematically shows one example of a functional configuration of a vehicle controller 402 provided to the vehicle 400. The vehicle controller 402 includes a manipulation content acquiring unit 410, an image-capturing unit 412, a radar apparatus 414, a Light Detection and Ranging (LIDAR) 416, an object recognizing unit 418, an image acquiring unit 420, a wireless communication unit 430 and a control unit 440. Note that the vehicle controller 402 does not necessarily include all of these components.

The manipulation content acquiring unit 410 acquires manipulation contents to a manipulating unit included in the vehicle 400. For example, the manipulation content acquiring unit 410 acquires contents of a steering angle of steering, a pedal pressure manipulation amount of an accelerator pedal, a pedal pressure manipulation amount of a brake pedal and the like.

The image-capturing unit 412 is a digital camera utilizing a solid-state imaging sensor such as Charge Coupled Device (CCD) or Complementary Metal Oxide Semiconductor (CMOS), for example. One or more image-capturing units 412 are provided to any position of the vehicle 400. In a case of image-capturing an area in front of the vehicle 400, the image-capturing unit 412 is provided to an upper portion of a front windshield, a rear side of a mirror, or the like. In a case where a plurality of image-capturing units 412 are provided thereon, the plurality of image-capturing units 412 may capture images in different directions. The image-capturing unit 412 captures an image of an area surrounding the vehicle 400 periodically and repeatedly, for example. The image-capturing unit 412 may also be a stereo camera.

The radar apparatus 414 radiates radio waves such as a millimeter wave toward areas surrounding the vehicle 400, and detects a radio wave (reflected wave) reflected by an object to detect at least a position (a distance and a direction) of the object. One or more radar apparatuses 414 are provided to any position of the vehicle 400. The radar apparatus 414 may also detect a position and a speed of the object by a Frequency Modulated Continuous Wave (FM-CW) manner.

The LIDAR 416 emits light toward areas surrounding the vehicle 400 to measure scattered light. The LIDAR 416 detects a distance to a target based on a period of time from light emission to light reception. The emitted light is, for example, pulse laser light. One or more LIDARs 416 are provided to any position of the vehicle 400.

The object recognizing unit 418 recognizes a position, a type, a speed and the like of the object based on a detection result by some or all of the image-capturing unit 412, the radar apparatus 414 and the LIDAR 416. The object recognizing unit 418 outputs the recognition result to the control unit 440. Also, if necessary, the object recognizing unit 418 may output, to the control unit 440, the detection results by the image-capturing unit 412, the radar apparatus 414 and the LIDAR 416 as they are.

The image acquiring unit 420 acquires an image captured by the image-capturing unit 412. The wireless communication unit 430 performs wireless communication with the remote driving managing apparatus 100, the remote driving facility 200 and the remote driving vehicle 300 via the network 80. In a case where the vehicle 400 is in a remotely driven mode, the wireless communication unit 430 sends the image acquired by the image acquiring unit 420 to the remote driving managing apparatus 100, the remote driving facility 200 or the remote driving vehicle 300. Also, in a case where the vehicle 400 is in a remotely driven mode, the wireless communication unit 430 receives a control signal based on remote driving from the remote driving managing apparatus 100, the remote driving facility 200 or the remote driving vehicle 300 and outputs the control signal to the control unit 440.

The control unit 440 controls the vehicle 400. The control unit 440 may have a position acquiring unit that acquires a position of the vehicle 400. The position acquiring unit receives position information of the vehicle 400 from the navigation apparatus included in the vehicle 400, for example. The navigation apparatus of the vehicle 400 has a Global Navigation Satellite System (GNSS) receiver, for example, and the GNSS receiver identifies the position of the vehicle 400 based on a signal received from a GNSS satellite. Note that the position acquiring unit may also have the GNSS receiver.

The control unit 440 may acquire destination information that indicates a destination of the vehicle 400 and route information that indicates the moving route to the destination. The control unit 440 acquires the destination information and the route information from the navigation apparatus included in the vehicle 400, for example.

The control unit 440 acquires first map information including at least map information of the moving route indicated by the route information. The control unit 440 receives the first map information from the navigation apparatus of the vehicle 400, for example. Also, the control unit 440 may also receive the first map information via the network 80 from a map management server that manages map information of various locations. The first map information is information in which shapes of roads are represented by links showing the roads and by nodes connected by the links, for example. The first map information may also include curvatures of the roads, Point Of Interest (POI) information or the like. The first map information may be updated as needed.

The control unit 440 may also further acquire second map information including at least map information of the moving route indicated by the route information. Similar to the first map information, the control unit 440 may receive the second map information from the navigation apparatus of the vehicle 400, or receive the second map information via the network 80. The second map information is map information with higher precision than the first map information. The second map information includes information of a center of a lane, information of a boundary between lanes or the like, for example. Also, the second map information may include road information, traffic regulation information and the like. The second map information may be updated as needed.

In a case where the vehicle 400 is in the automated driving mode, the control unit 440 may control the travelling of the vehicle 400 by using the position acquired by the position acquiring unit, the information received from the object recognizing unit 418 and the first map information. The control unit 440 may control the travelling of the vehicle 400 by further using the second map information. In a case where the vehicle 400 is in the manual driving mode, the control unit 440 may control the travelling of the vehicle 400 according to the manipulation contents acquired by the manipulation content acquiring unit 410.

In a case where the vehicle 400 is in the remotely driven mode, the control unit 440 controls the travelling of the vehicle 400 according to the control signal received by the wireless communication unit 430 from the remote driving managing apparatus 100, the remote driving facility 200 or the remote driving vehicle 300.

Figure 3:
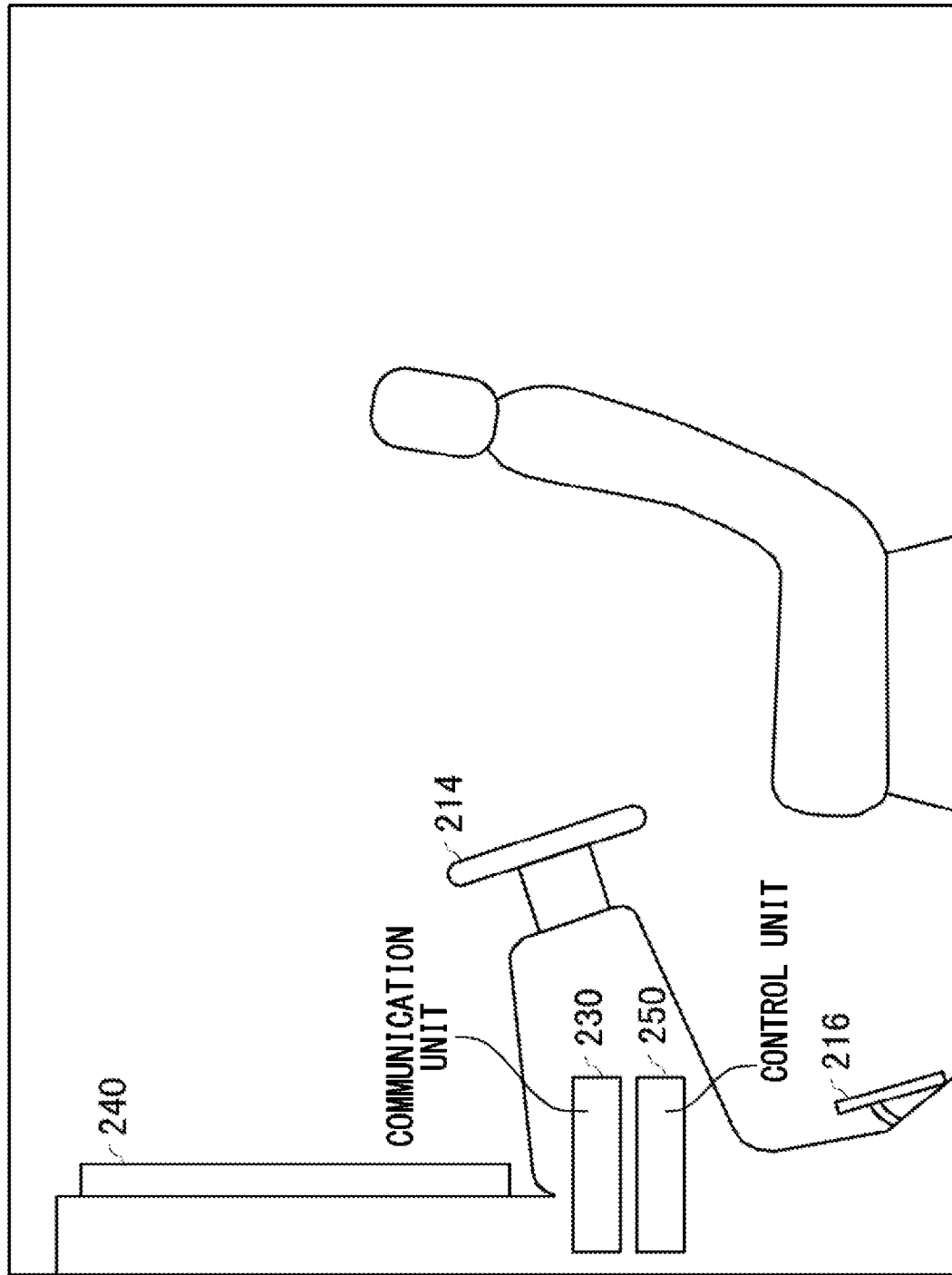
FIG. 3 schematically shows one example of a remote driving facility 200.

FIG. 3 schematically shows one example of a remote driving facility 200. In FIG. 3, the illustration of a manipulation member other than the handle 214 and the pedal 216 is omitted.

The remote driving facility 200 includes a communication unit 230, a display unit 240 and a control unit 250. The communication unit 230 communicates with the remote driving managing apparatus 100. Also, the communication unit 230 communicates with the vehicle 400. The communication unit 230 may communicate with the vehicle 400 via the remote driving managing apparatus 100. Also, the communication unit 230 may also communicate with the vehicle 400 via the network 80 instead of the remote driving managing apparatus 100.

The communication unit 230 receives an image sent by the wireless communication unit 430 of the vehicle 400. The display unit 240 displays the image received by the communication unit 230 from the vehicle 400. Note that the remote driving facility 200 may also include a projector and a screen instead of the display unit 240, and in this case, the projector may project the image received by the communication unit 230 on the screen.

The control unit 250 acquires manipulation contents to the manipulation member of the remote driving facility 200, and causes the communication unit 230 to send a signal indicating the manipulation contents to the vehicle 400. The control unit 250 sends, to the communication unit 230, the steering angle of steering, the pedal pressure manipulation amount of the pedal 216 and the like, for example.

Figure 4:
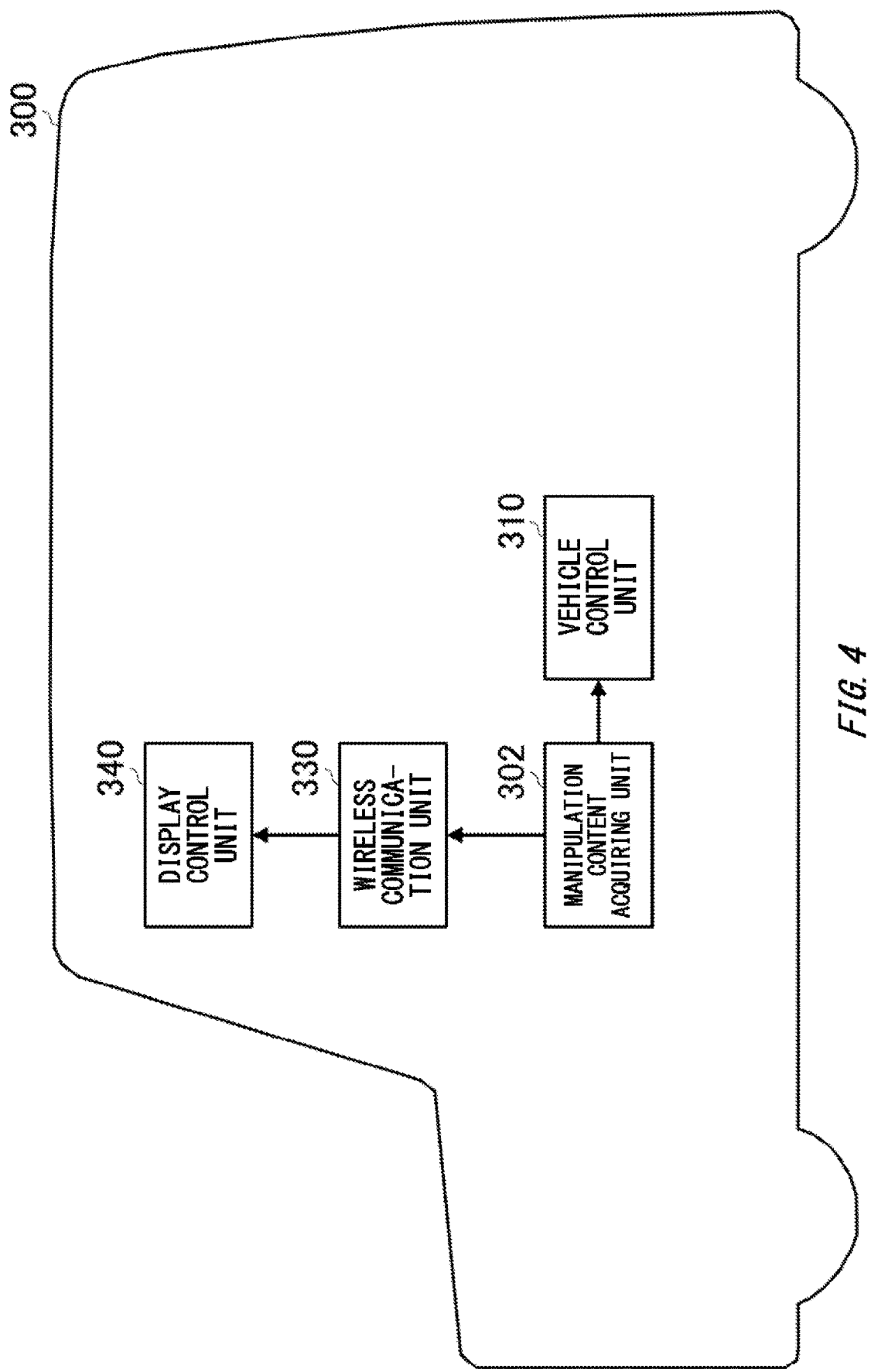
FIG. 4 schematically shows one example of a functional configuration of a remote driving vehicle 300.

FIG. 4 schematically shows one example of the functional configuration of the remote driving vehicle 300. The remote driving vehicle 300 includes a manipulation content acquiring unit 302, a vehicle control unit 310, a wireless communication unit 330 and a display control unit 340.

The manipulation content acquiring unit 302 acquires manipulation content to a manipulating unit included in the remote driving vehicle 300. For example, the manipulation content acquiring unit 302 acquires the steering angle of the steering, the pedal pressure manipulation amount of the accelerator pedal, the pedal pressure manipulation amount of the brake pedal and the like.

In a case where the remote driving vehicle 300 is in the manual driving mode, the manipulation content acquiring unit 302 outputs, to the vehicle control unit 310, a signal indicating the acquired manipulation contents. The vehicle control unit 310 controls the remote driving vehicle 300 according to the signal acquired from the manipulation content acquiring unit 302.

In a case where the remote driving vehicle 300 is in the remote driving mode, the manipulation content acquiring unit 302 outputs the acquired manipulation contents to the wireless communication unit 330. The wireless communication unit 330 sends the acquired signal from the manipulation content acquiring unit 302 to the vehicle 400 via the network 80.

In a case where the remote driving vehicle 300 is in the remote driving mode, the wireless communication unit 330 receives an image sent by the wireless communication unit 430 of the vehicle 400 and outputs the image to the display control unit 340. The display control unit 340 displays the received image on a display unit included in the remote driving vehicle 300.

In a case where the automated driving can be performed on the remote driving vehicle 300, the remote driving vehicle 300 may further include a similar configuration to that of the image-capturing unit 412, the radar apparatus 414, the LIDAR 416 and the object recognizing unit 418.

Figure 5:
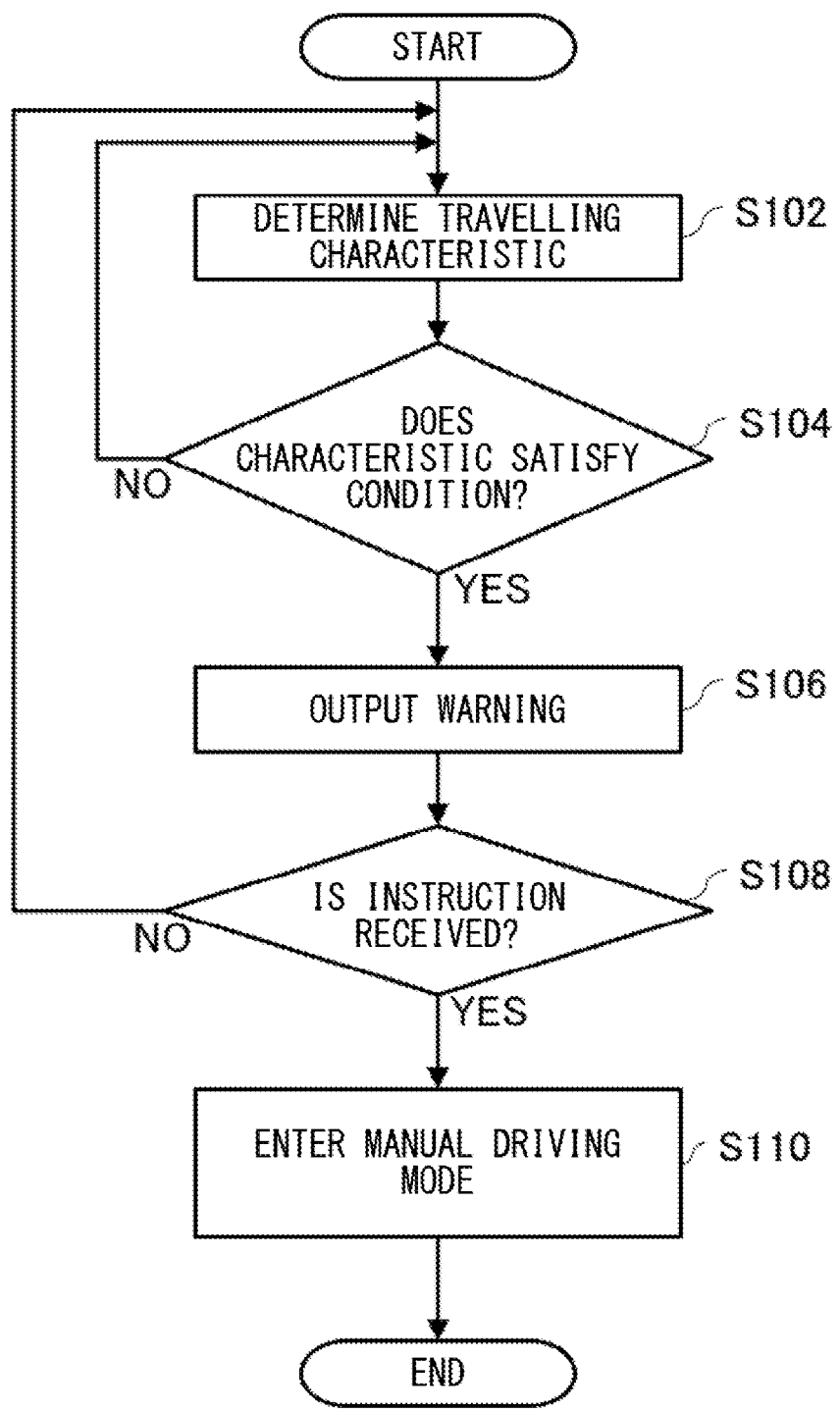
FIG. 5 schematically shows one example of a processing flow by a vehicle controller 402.

FIG. 5 schematically shows one example of a processing flow by the vehicle controller 402. FIG. 5 shows a processing flow, in a case where the vehicle 400 is in the remotely driven mode, from a time when the vehicle 400 starts to travel according to the control signal based on the remote driving to a time when the vehicle 400 enters the manual driving mode.

In step 102 (the term "step" may be abbreviated to "S"), the control unit 440 determines a travelling characteristic of the vehicle 400. Examples of the travelling characteristic of the vehicle 400 include the following: a travelling speed characteristic, a characteristic of the number of times of travelling acceleration/deceleration, an intervehicle distance characteristic of the vehicle 400 and another vehicle, and the like.

The travelling speed characteristic indicates whether the travelling speed is fast or slow relative to an average travelling speed, for example. As a specific example, the travelling speed characteristic is represented by levels such as fast, slightly fast, average, slightly slow, slow and the like. Stages of the levels are not limited to five stages and may be stages in any number.

The characteristic of the number of times of acceleration/deceleration indicates whether the number of times of acceleration/deceleration is large or small relative to an average number of times of acceleration/deceleration, for example. As a specific example, the characteristic of the number of times of acceleration/deceleration is represented by levels of large, slightly large, average, slightly small, small and the like. Stages of the levels are not limited to five stages and may be stages in any number.

The intervehicle distance characteristic indicates whether the intervehicle distance is long or short relative to an average intervehicle distance, for example. As a specific example, the intervehicle distance characteristic is represented by levels of long, slightly long, average, slightly short, short and the like. Stages of the levels are not limited to five stages and may be stages in any number.

In S104, the control unit 440 determines whether or not the characteristic determined in S102 satisfies a predetermined condition. The predetermined condition may be a condition regarding the travelling speed characteristic, a condition regarding the characteristic of the number of times of travelling acceleration/deceleration, a condition regarding the intervehicle distance characteristic of the vehicle 400 and another vehicle, and the like. For example, the predetermined condition may be "the travelling speed characteristic is fast", "the characteristic of the number of times of acceleration/deceleration is large or slightly large", "the intervehicle distance characteristic is short" and the like. The predetermined condition may also include a plurality of conditions. In S104, if it is determined that the condition is satisfied the step advances to S106, and if it is determined that the condition is not satisfied, the step returns to S102.

In S106, the control unit 440 outputs a warning to the occupant 40 of the vehicle 400. The control unit 440 may output the warning via a display unit included in the vehicle 400. The warning may include contents for inquiring the occupant 40 about whether to enter the manual driving mode or not. For example, the warning includes a reception object that receives an instruction to enter the manual driving mode.

In S108, the control unit 440 determines whether or not the instruction to enter the manual driving mode is received from the occupant 40 of the vehicle 400. If it is determined that the instruction is received, the step advances to S110, and if it is determined that the instruction is not received, the step returns to S102. For example, if the instruction to enter the manual driving mode is not received during a period of time from a time when the warning is output in S106 to a time when a predetermined time elapses, the control unit 440 determines, in S108, that the instruction is not received. Also, in S106, the control unit 440 outputs a warning including a reception object that receives an instruction to enter the manual driving mode and an instruction not to enter the manual driving mode, and if the instruction not to enter the manual driving mode is received, determines, in S108, that the instruction is not received. In S110, the control unit 440 causes the vehicle 400 to exit the remotely driven mode and enter the manual driving mode.

Figure 6:
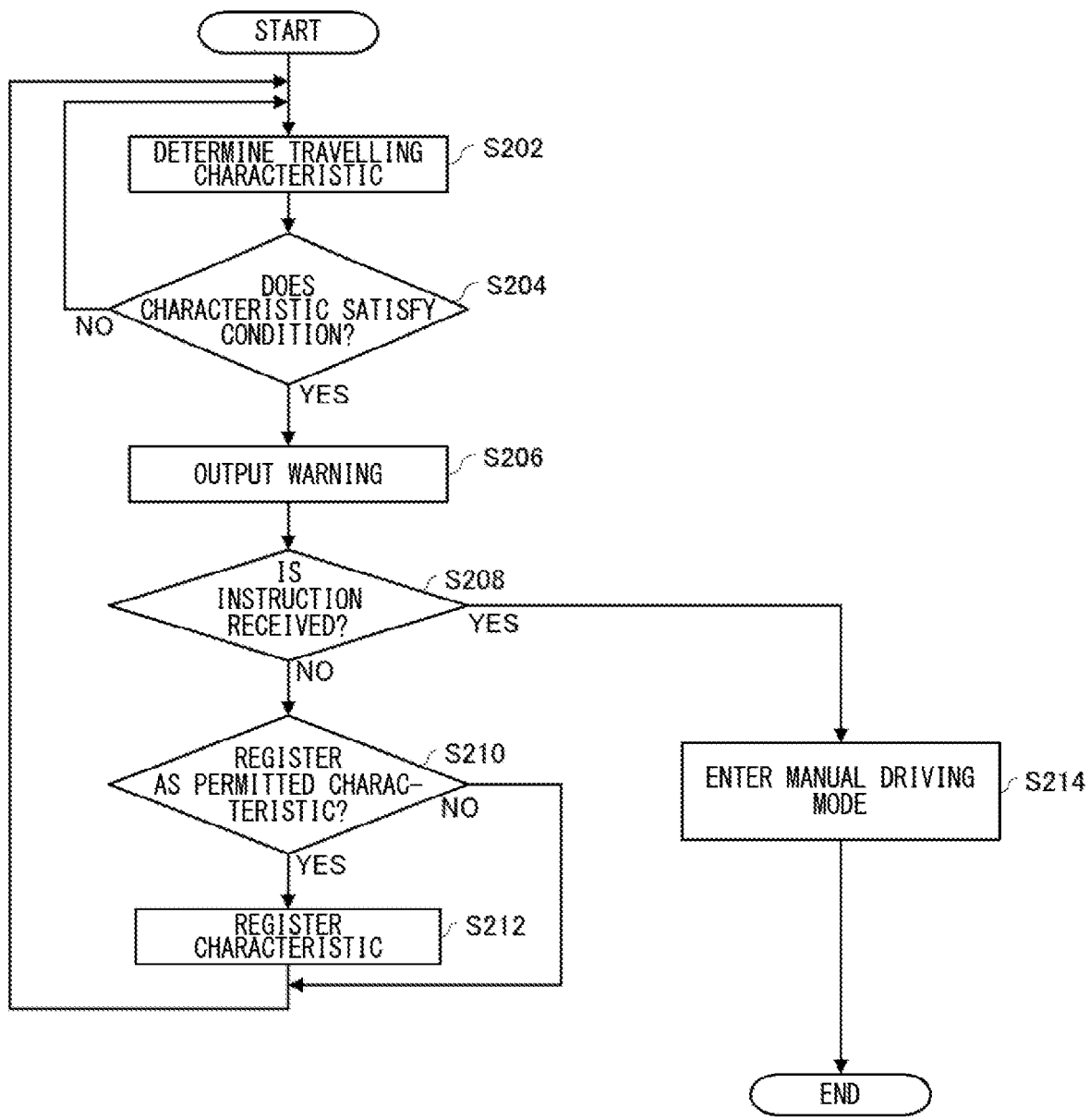
FIG. 6 schematically shows one example of a processing flow by the vehicle controller 402.

FIG. 6 schematically shows one example of a processing flow by the vehicle controller 402. FIG. 6 shows a processing flow, in a case where the vehicle 400 is in the remotely driven mode, from a time when the vehicle 400 starts to travel according to the control signal based on the remote driving to a time when the vehicle 400 enters the manual driving mode. Here, different respects from those in FIG. 5 are mainly described.

In S202, the control unit 440 determines the travelling characteristic of the vehicle 400. In S204, the control unit 440 determines whether or not the characteristic determined in S202 satisfies a predetermined condition. If it is determined that the predetermined condition is satisfied, the step advances to S206, and if it is determined that the predetermined condition is not satisfied, the step returns to S202.

In S206, the control unit 440 outputs a warning to the occupant 40 of the vehicle 400. The control unit 440 may output the warning via a display unit provided to the vehicle 400. The warning includes contents for inquiring the occupant 40 about whether to enter the manual driving mode or not. For example, the warning includes a reception object that receives an instruction to enter the manual driving mode. Also, the warning includes information that indicates a condition that the characteristic determined in S202 satisfies. For example, if a condition that the travelling speed characteristic is fast is satisfied, the warning includes information indicating the condition that the travelling speed characteristic is fast.

In S208, the control unit 440 determines whether or not the instruction to enter the manual driving mode is received from the occupant 40 of the vehicle 400. If it is determined that the instruction is received, the step advances to S214, and if it is determined that the instruction is not received, the step advances to S208.

In S210, the control unit 440 determines whether to register or not the characteristic that satisfies the condition as a permitted characteristic. The control unit 440 displays, on a display unit of the vehicle 400, the inquiry information for inquiring about whether to register or not, and determine whether to register or not according to an input of the occupant 40 with respect to the inquiry information, for example. If it is determined to register, the step advances to S212, and if it is determined not to register, the step returns to S202.

In S212, the control unit 440 registers the characteristic that satisfies the condition as the permitted characteristic. Then, the step returns to S202. After the registration, in S204, the control unit 440 returns to S202 if the characteristic determined in S202 matches the permitted characteristic. In S214, the control unit 440 causes the vehicle 400 to exit the remotely driven mode and enter the manual driving mode.

Figure 7:
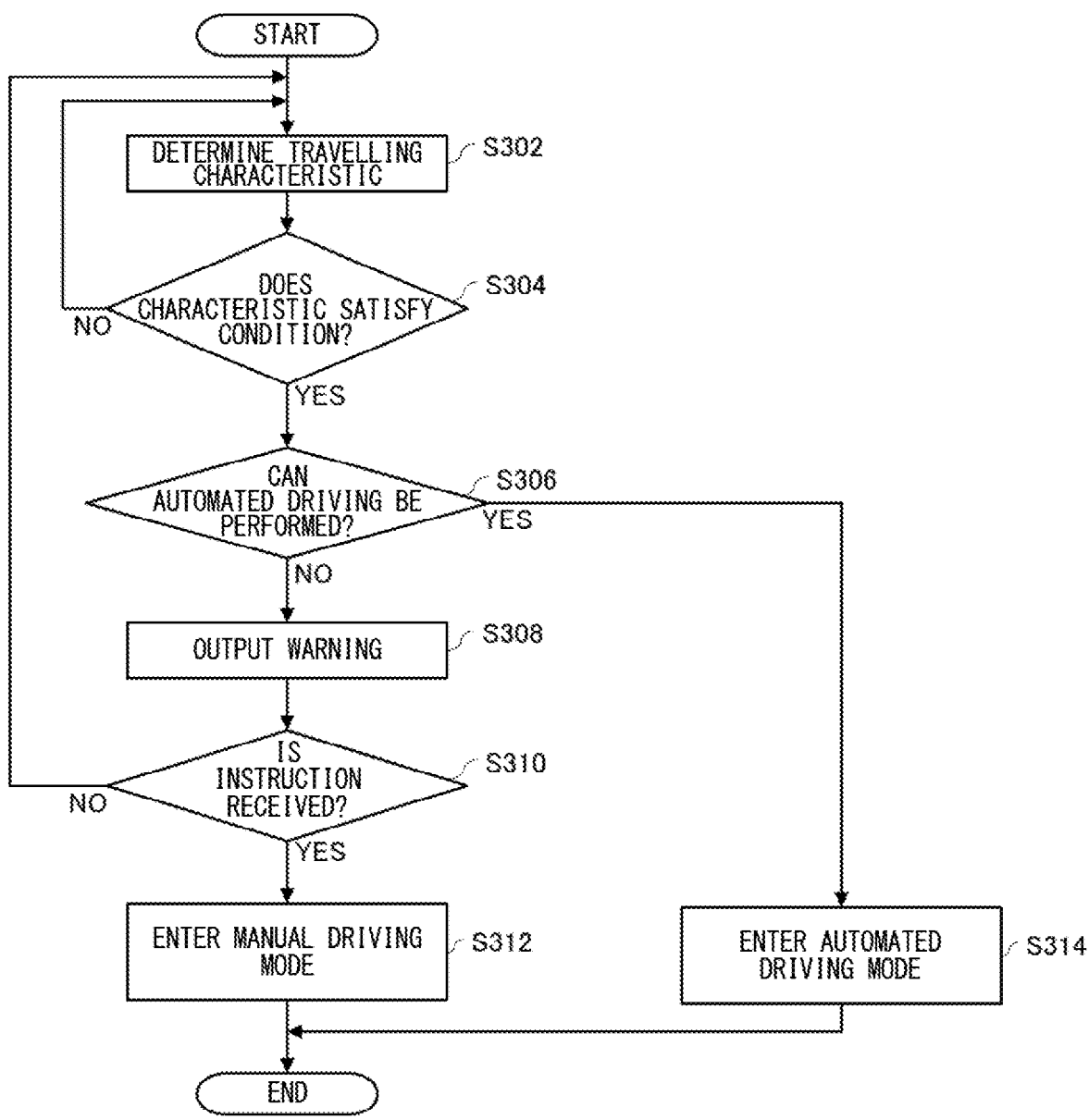
FIG. 7 schematically shows one example of a processing flow by the vehicle controller 402.

FIG. 7 schematically shows one example of a processing flow by the vehicle controller 402. FIG. 7 shows a processing flow, in a case where the vehicle 400 is in the remotely driven mode, from a time when the vehicle 400 starts to travel according to the control signal based on the remote driving to a time when the vehicle 400 enters the manual driving mode or the automated driving mode. Here, different respects from those in FIG. 5 are mainly described.

In S302, the control unit 440 determines the travelling characteristic of the vehicle 400. In S304, the control unit 440 determines whether or not the characteristic determined in S302 satisfies a predetermined condition. If it is determined that the condition is satisfied, the step advances to S306, and if it is determined that the condition is not satisfied, the step returns to S302.

In S306, the control unit 440 determines whether the automated driving can be performed or not. For example, when the road on which the vehicle 400 is travelling is within a section in which the automated driving cannot be performed or within a section in which the automated driving is prohibited, the control unit 440 determines that the automated driving is prohibited, and when the road is within a section other than the above section, the control unit 440 determines that the automated driving can be performed. If it is determined that the automated driving is prohibited, the step advances to S308, and if it is determined that the automated driving can be performed, the step advances to S314. S308, S310, and S312 may be similar to S106, S108 and S110. In S314, the control unit 440 causes the vehicle 400 to exit the remotely driven mode and enter the automated driving mode.

Figure 8:
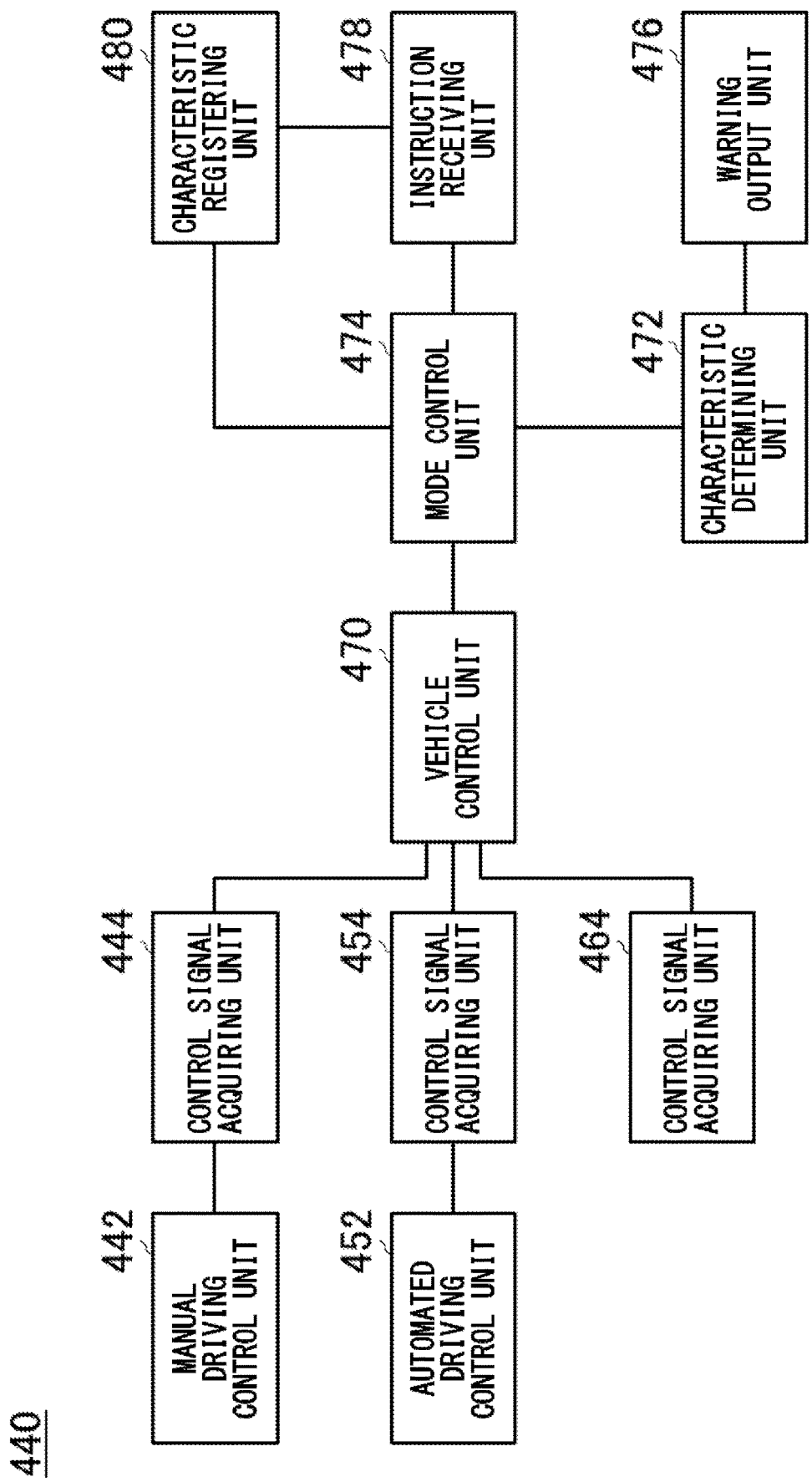
FIG. 8 schematically shows one example of a functional configuration of a control unit 440.

FIG. 8 schematically shows one example of a functional configuration of the control unit 440. The control unit 440 includes a manual driving control unit 442, a control signal acquiring unit 444, an automated driving control unit 452, a control signal acquiring unit 454, a control signal acquiring unit 464, a vehicle control unit 470, a characteristic determining unit 472, a mode control unit 474, a warning output unit 476, an instruction receiving unit 478 and a characteristic registering unit 480. Note that the control unit 440 does not necessarily include all of these components.

The manual driving control unit 442 controls the manual driving of the vehicle 400. The manual driving control unit 442 generates a control signal based on the manipulation contents acquired by the manipulation content acquiring unit 410. The control signal acquiring unit 444 acquires the control signal generated by the manual driving control unit 442 and outputs the control signal to the vehicle control unit 470. The control signal acquired by the control signal acquiring unit 444 may be one example of a first control signal.

The automated driving control unit 452 controls the automated driving of the vehicle 400. The automated driving control unit 452 generates the control signal by using a position acquired by a position acquiring unit that is not shown in the drawings and information and the first map information received from the object recognizing unit 418, for example. The control signal acquiring unit 454 acquires the control signal generated by the automated driving control unit 452 and outputs the control signal to the vehicle control unit 470. The control signal acquired by the control signal acquiring unit 454 may be one example of the first control signal.

The control signal acquiring unit 464 acquires the control signal based on the remote driving. The control signal acquiring unit 464 acquires the control signal received by the wireless communication unit 430 from the remote driving facility 200 or the remote driving vehicle 300 and outputs the control signal to the vehicle control unit 470. The control signal acquired by the control signal acquiring unit 464 may be one example of a second control signal.

The vehicle control unit 470 controls the vehicle 400. In a case where the vehicle 400 is in the manual driving mode, the vehicle control unit 470 controls the vehicle 400 according to the control signal received from the control signal acquiring unit 444. In a case where the vehicle 400 is in the automated driving mode, the vehicle control unit 470 controls the vehicle 400 according to the control signal received from the control signal acquiring unit 454. In a case where the vehicle 400 is in the remotely driven mode, the vehicle control unit 470 controls the vehicle 400 according to the control signal received from the control signal acquiring unit 464.

The characteristic determining unit 472 determines the travelling characteristic of the vehicle 400. The characteristic determining unit 472 determines the travelling characteristic of the vehicle 400 during a period of time in which the vehicle 400 is in the remotely driven mode and the vehicle control unit 470 is controlling the vehicle 400 according to the control signal acquired by the control signal acquiring unit 464.

The characteristic determining unit 472 determines the travelling speed characteristic of the vehicle 400, for example. Also, the characteristic determining unit 472 determines the characteristic of the number of times of travelling acceleration/deceleration of the vehicle 400, for example. Also, the characteristic determining unit 472 determines the intervehicle distance characteristic of the vehicle 400 and another vehicle, for example.

The characteristic determining unit 472 may also determine a travelling safety degree of the vehicle 400. The characteristic determining unit 472 determines the travelling safety degree of the vehicle 400 based on at least any one of the travelling speed characteristic, the characteristic of the number of times of acceleration/deceleration, the intervehicle distance characteristic, for example. As a specific example, the characteristic determining unit 472 derives a safety degree that is higher if the travelling speed characteristic shows a lower travelling speed. Also, the characteristic determining unit 472 derives a safety degree that is higher if the characteristic of the number of times of acceleration/deceleration shows a smaller number of times. Also, the characteristic determining unit 472 derives a safety degree that is higher if the intervehicle distance characteristic is longer.

The characteristic determining unit 472 may also determine a travelling risk degree of the vehicle 400. The characteristic determining unit 472 determines the travelling risk degree of the vehicle 400 based on at least any one of the travelling speed characteristic, the characteristic of the number of times of acceleration/deceleration, the intervehicle distance characteristic, for example. As a specific example, the characteristic determining unit 472 derives a risk degree that is higher if the travelling speed characteristic indicates a faster travelling speed. Also, the characteristic determining unit 472 derives a risk degree that is higher if the characteristic of the number of times of acceleration/deceleration indicates a larger number of times. Also, the characteristic determining unit 472 derives a risk degree that is higher if the intervehicle distance characteristic is shorter.

If the characteristic determined by the characteristic determining unit 472 satisfies a predetermined condition, the mode control unit 474 causes the vehicle 400 to exit the remotely driven mode and enter the manual driving mode or the automated driving mode. The predetermined condition may include a plurality of conditions. For example, the predetermined condition includes a condition regarding the travelling speed characteristic, a condition regarding the characteristic of the number of times of acceleration/deceleration and a condition regarding the intervehicle distance characteristic. Also, the predetermined condition includes a threshold of the travelling safety degree. Also, the predetermined condition includes a threshold of the travelling risk degree. If the characteristic determined by the characteristic determining unit 472 satisfies any one of the plurality of conditions, the mode control unit 474 may cause the vehicle 400 to exit the remotely driven mode and enter the manual driving mode or the automated driving mode.

If the characteristic determined by the characteristic determining unit 472 satisfies a predetermined condition, the mode control unit 474 may also determine whether the automated driving can be performed or not, and when it is determined that the automated driving can be performed, cause the vehicle 400 to enter the automated driving mode and when it is determined that the automated driving is prohibited, cause the vehicle 400 to enter the manual driving mode.

If the characteristic determined by the characteristic determining unit 472 satisfies the predetermined condition, the warning output unit 476 outputs a warning to the occupant 40 of the vehicle 400. The warning output unit 476 may make a display output of the warning via a display unit provided to the vehicle 400. Also, the warning output unit 476 may make an audio output of the warning via an audio output unit provided to the vehicle 400.

The warning output unit 476 may also output the warning including information indicating the condition that the characteristic determined by the characteristic determining unit 472 satisfies. The warning may also include contents for inquiring the occupant 40 about whether to enter the manual driving mode or not. For example, the warning output unit 476 makes a display output of the warning including a reception object that receives an instruction to enter the manual driving mode. Also, the warning may also include contents for inquiring the occupant 40 about whether to enter the automated driving mode or not. For example, the warning output unit 476 makes a display output of the warning including the reception object that receives an instruction to enter the automated driving mode.

After the warning is output by the warning output unit 476, the instruction receiving unit 478 receives the instruction made by the occupant 40 of the vehicle 400 to enter the manual driving mode or the automated driving mode. The instruction receiving unit 478 receives the instruction to enter the manual driving mode or the automated driving mode according to the reception object included in the warning, for example. The mode control unit 474 may standby for the entering the manual driving mode or the automated driving mode until the instruction receiving unit 478 receives the instruction to enter the manual driving mode or the automated driving mode, and may cause the vehicle 400 to enter the manual driving mode or the automated driving mode in response to a reception of the instruction.

The instruction receiving unit 478 may also receive an instruction to register the characteristic satisfying the predetermined condition as a permitted characteristic. For example, the instruction receiving unit 478 displays, on the display unit of the vehicle 400, the inquiry information for inquiring about whether to register or not the characteristic satisfying the predetermined condition as the permitted characteristic, and receives the instruction for registration according to the inquiry information.

The characteristic registering unit 480 registers, as the permitted characteristic, the characteristic indicated in the instruction to register as the permitted characteristic, the instruction received by the instruction receiving unit 478. If the characteristic determined by the characteristic determining unit 472 matches the permitted characteristic registered by the characteristic registering unit 480, the mode control unit 474 may not determine whether the predetermined condition is satisfied or not. The mode control unit 474 may determine whether or not a characteristic that is among characteristics determined by the characteristic determining unit 472 and that is different from the permitted characteristic satisfies the predetermined condition.

Figure 9:
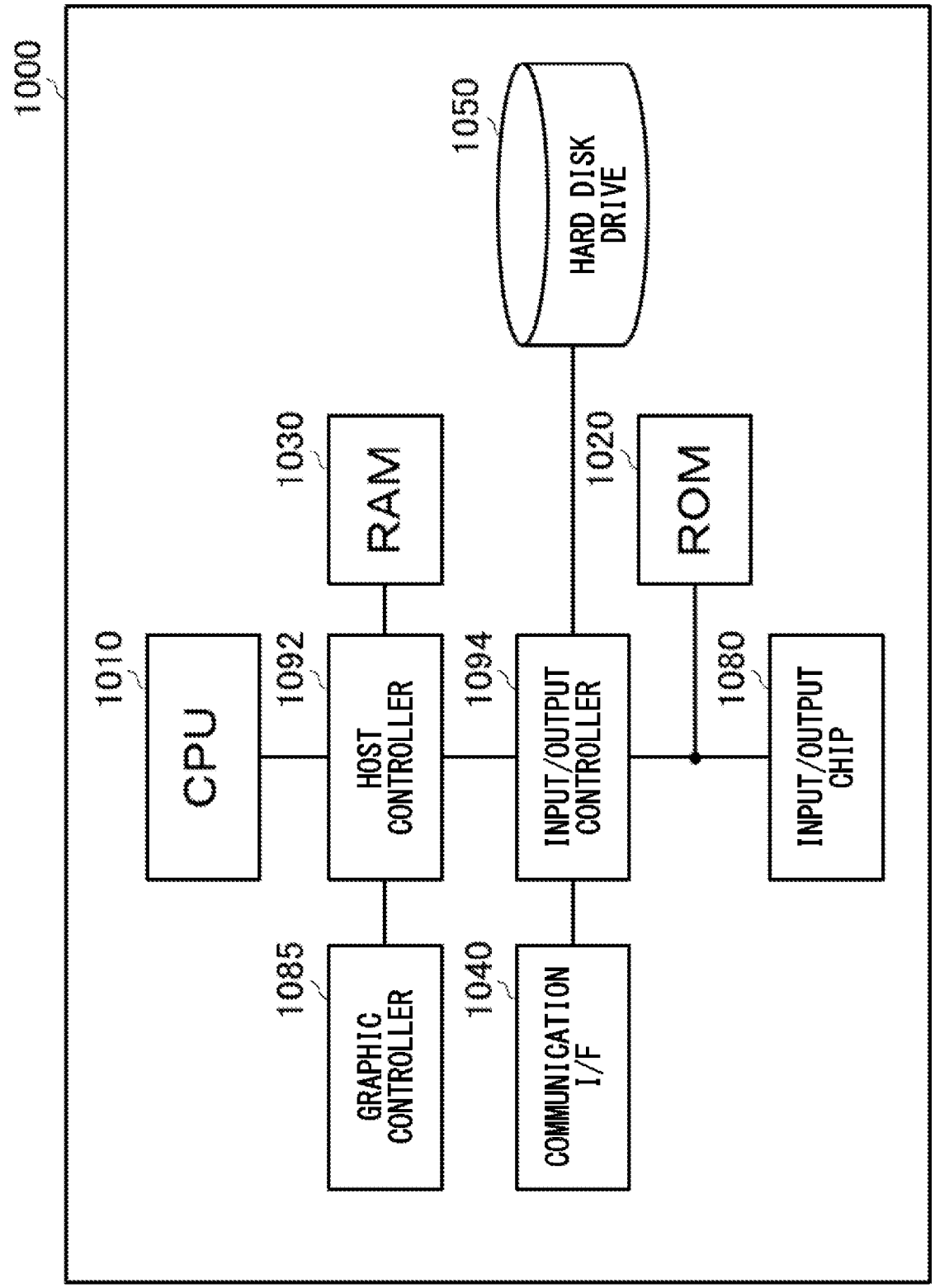
FIG. 9 schematically shows one example of a computer 1000 that functions as the control unit 440.

FIG. 9 schematically shows one example of a hardware configuration of a computer 1000 that functions as the control unit 440. The computer 1000 according to the present embodiment includes a CPU peripheral unit having a CPU 1010, a RAM 1030 and a graphic controller 1085 that are mutually connected by a host controller 1092, and an input/output unit having a ROM 1020, a communication I/F 1040, a hard disk drive 1050 and an input/output chip 1080 that are connected to the host controller 1092 by an input/output controller 1094.

The CPU 1010 operates based on programs stored in the ROM 1020 and the RAM 1030 to perform controlling on each unit. The graphic controller 1085 acquires image data generated by the CPU 1010 and the like on a frame buffer provided within the RAM 1030, and displays the image data on a display. Instead of this, the graphic controller 1085 may also include the frame buffer that stores the image data generated by the CPU 1010 and the like therein.

The communication I/F 1040 communicates with another apparatus via a wired or wireless network. Also, the communication I/F 1040 functions as hardware performing communications. The hard disk drive 1050 stores programs and data that are used by the CPU 1010.

The ROM 1020 stores a boot program that is executed when the computer 1000 runs, and a program and the like depending on the hardware of the computer 1000. The input/output chip 1080 connects various input/output devices to the input/output controller 1094 via a parallel port, a serial port, a keyboard port, a mouse port and the like, for example.

A program provided to the hard disk drive 1050 via the RAM 1030 is stored in a recording medium such as an IC card and is provided to a user. The program is read from the recording medium, installed in the hard disk drive 1050 via the RAM 1030, and executed on the CPU 1010.

A program that is installed in the computer 1000 and that causes the computer 1000 to function as the control unit 440 may work on the CPU 1010 and the like to cause the computer 1000 to respectively function as each unit of the control unit 440. The information processing described in these programs function, by being read by the computer 1000, as the manual driving control unit 442, the control signal acquiring unit 444, the automated driving control unit 452, the control signal acquiring unit 454, the control signal acquiring unit 464, the vehicle control unit 470, the characteristic determining unit 472, the mode control unit 474, the warning output unit 476, the instruction receiving unit 478, and the characteristic registering unit 480 that are specific means on which software and the above-described various hardware resources cooperate with each other. Then, by implementing, by these specific means, an information operation or processing in accordance with a purpose of use of the computer 1000 in the present embodiment, a specific control unit 440 in accordance with the purpose of use is constructed.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 . . . remote driving system; 12 . . . remote driving management center; 20 . . . driver; 30 . . . driver; 40 . . . occupant; 80 . . . network; 100 . . . remote driving managing apparatus; 200 . . . remote driving facility; 214 . . . handle; 216 . . . pedal; 230 . . . communication unit; 240 . . . display unit; 250 . . . control unit; 300 . . . remote driving vehicle; 302 . . . manipulation content acquiring unit; 310 . . . vehicle control unit; 330 . . . wireless communication unit; 340 . . . display control unit; 400 . . . vehicle; 402 . . . vehicle controller; 410 . . . manipulation content acquiring unit; 412 . . . image-capturing unit; 414 . . . radar apparatus; 416 . . . LIDAR; 418 . . . object recognizing unit; 420 . . . image acquiring unit; 430 . . . wireless communication unit; 440 . . . control unit; 442 . . . manual driving control unit; 444 . . . control signal acquiring unit; 452 . . . automated driving control unit; 454 . . . control signal acquiring unit; 464 . . . control signal acquiring unit; 470 . . . vehicle control unit; 472 . . . characteristic determining unit; 474 . . . mode control unit; 476 . . . warning output unit; 478 . . . instruction receiving unit; 480 . . . characteristic registering unit; 1000 . . . computer; 1010 . . . CPU; 1020 . . . ROM; 1030 . . . RAM; 1040 . . . communication I/F; 1050 . . . hard disk drive; 1080 . . . input/output chip; 1085 . . . graphic controller; 1092 . . . host controller; 1094 . . . input/output controller

What is claimed is:

1. A vehicle controller that controls a vehicle having a first driving mode in which the vehicle travels according to a first control signal based on manual driving or automated driving, and a second driving mode in which the vehicle travels according to a second control signal based on remote driving, the vehicle controller comprising:
   a vehicle control unit configured to control the vehicle according to the first control signal when the vehicle is in the first driving mode, and controls the vehicle according to the second control signal when the vehicle is in the second driving mode;
   a characteristic determining unit configured to determine a travelling characteristic of the vehicle during a period in which the vehicle is in the second driving mode and the vehicle control unit is controlling the vehicle according to the second control signal;
   a mode control unit configured to
   when a characteristic determined by the characteristic determining unit satisfies a predetermined condition, cause the vehicle to exit the second driving mode and enter the first driving mode;
   a warning output unit configured to
   when the characteristic determined by the characteristic determining unit satisfies the predetermined condition, output a warning to an occupant of the vehicle; and
   an instruction receiving unit configured to,
   after the warning output unit outputs the warning, receive an instruction made by the occupant of the vehicle to enter the first driving mode,
   wherein
   the mode control unit is further configured to cause the vehicle to exit the second driving mode and enter the first driving mode in response to a reception, by the instruction receiving unit, of the instruction to enter the first driving mode.

2. The vehicle controller according to claim 1, wherein the characteristic determining unit is configured to determine a travelling speed characteristic of the vehicle.

3. The vehicle controller according to claim 1, wherein the characteristic determining unit is configured to determine a characteristic of a number of times of travelling acceleration/deceleration of the vehicle.

4. The vehicle controller according to claim 1, wherein the characteristic determining unit is configured to determine an intervehicle distance characteristic of the vehicle and another vehicle.

5. The vehicle controller according to claim 1, wherein the characteristic determining unit is configured to determine a travelling safety degree of the vehicle, and
   the mode control unit is configured to: when the safety degree is less than a predetermined threshold, cause the vehicle to exit the second driving mode and enter the first driving mode.

6. The vehicle controller according to claim 5, wherein the characteristic determining unit is configured to determine the travelling safety degree of the vehicle based on at least any one of a travelling speed characteristic of the vehicle, a characteristic of a number of times of travelling acceleration/deceleration of the vehicle, and an intervehicle di stance characteristic of the vehicle and another vehicle.

7. The vehicle controller according to claim 1, wherein the characteristic determining unit is configured to determine a travelling risk degree of the vehicle, and
   the mode control unit is configured to: when the risk degree is greater than a predetermined threshold, cause the vehicle to exit the second driving mode and enter the first driving mode.

8. The vehicle controller according to claim 7, wherein the characteristic determining unit is configured to determine the travelling risk degree of the vehicle based on at least any one of a travelling speed characteristic of the vehicle, a characteristic of a number of times of travelling acceleration/deceleration of the vehicle, and an intervehicle di stance characteristic of the vehicle and another vehicle.

9. The vehicle controller according to claim 1, wherein the warning output unit is configured to output a warning including information that indicates a condition that a characteristic determined by the characteristic determining unit satisfies.

10. The vehicle controller according to claim 1, wherein the warning output unit is configured to output a warning including a reception object that receives an instruction to enter a manual driving mode in which the vehicle travels according to the first control signal based on manual driving,
    the instruction receiving unit is configured to, after the warning output unit outputs the warning, receive an instruction made by the occupant of the vehicle to enter the manual driving mode, and
    the mode control unit is configured to cause the vehicle to exit the second driving mode and enter the manual driving mode in response to a reception, by the instruction receiving unit, of the instruction to enter the manual driving mode.

11. The vehicle controller according to claim 1, wherein the warning output unit is configured to output a warning including a reception object that receives an instruction to enter an automated driving mode in which the vehicle travels according to the first control signal based on automated driving,
    the instruction receiving unit is configured to, after the warning output unit outputs the warning, receive the instruction made by the occupant of the vehicle to enter the automated driving mode, and
    the mode control unit is configured to cause the vehicle to exit the second driving mode and enter the automated driving mode in response to a reception of the instruction, by the instruction receiving unit, to enter the automated driving mode.

12. The vehicle controller according to claim 1, wherein the first driving mode includes a manual driving mode in which the vehicle travels according to the first control signal based on manual driving, and an automated driving mode in which the vehicle travels according to the first control signal based on automated driving, and the mode control unit is configured to, when a characteristic determined by the characteristic determining unit satisfies the predetermined condition, determine whether the automated driving is permissible or not, and when it is determined that the automated driving is permissible, cause the vehicle to exit the second driving mode and enter the automated driving mode; or when it is determined that the automated driving is not permissible, cause the vehicle to exit the second driving mode and enter the manual driving mode.

13. The vehicle controller according to claim 1, comprising
a characteristic registering unit configured to, in response to a reception of an instruction to register the characteristic that satisfies the predetermined condition as a permitted characteristic, register the characteristic as a permitted characteristic, wherein
the mode control unit is configured to determine whether or not a different characteristic from the permitted characteristic among characteristics determined by the characteristic determining unit satisfies a predetermined condition.

14. A non-transitory computer readable storage medium that stores a program for causing a computer provided to a vehicle having a first driving mode in which the vehicle travels according to a first control signal based on manual driving or automated driving and a second driving mode in which the vehicle travels according to a second control signal based on remote driving to function as
a characteristic determining unit configured to determine a travelling characteristic of the vehicle during a period in which a vehicle control unit is controlling the vehicle according to the second control signal, the vehicle control unit being configured to control the vehicle according to the first control signal when the vehicle is in the first driving mode and to control the vehicle according to the second control signal when the vehicle is in the second driving mode, and
a mode control unit configured to, when a characteristic determined by the characteristic determining unit satisfies a predetermined condition, cause the vehicle to exit the second driving mode and enter the first driving mode;

a warning output unit configured to
when the characteristic determined by the characteristic determining unit satisfies the predetermined condition, output a warning to an occupant of the vehicle; and
an instruction receiving unit configured to,
after the warning output unit outputs the warning, receive an instruction made by the occupant of the vehicle to enter the first driving mode, wherein
the mode control unit is further configured to cause the vehicle to exit the second driving mode and enter the first driving mode in response to a reception, by the instruction receiving unit, of the instruction to enter the first driving mode.

15. A vehicle controller that controls a vehicle having a first driving mode in which the vehicle travels according to a first control signal based on manual driving or automated driving, and a second driving mode in which the vehicle travels according to a second control signal based on remote driving, the vehicle controller comprising:
a vehicle control unit configured to control the vehicle according to the first control signal when the vehicle is in the first driving mode, and controls the vehicle according to the second control signal when the vehicle is in the second driving mode;
a characteristic determining unit configured to determine a travelling characteristic of the vehicle during a period in which the vehicle is in the second driving mode and the vehicle control unit is controlling the vehicle according to the second control signal; and
a mode control unit configured to
when a characteristic determined by the characteristic determining unit satisfies a predetermined condition, cause the vehicle to exit the second driving mode and enter the first driving mode;
wherein
the first driving mode includes a manual driving mode in which the vehicle travels according to the first control signal based on manual driving, and an automated driving mode in which the vehicle travels according to the first control signal based on automated driving, and
the mode control unit is further configured to, when a characteristic determined by the characteristic determining unit satisfies the predetermined condition, determine whether the automated driving is permissible or not, and when it is determined that the automated driving is permissible, cause the vehicle to exit the second driving mode and enter the automated driving mode; or when it is determined that the automated driving is not permissible, cause the vehicle to exit the second driving mode and enter the manual driving mode.

* * * * *